United States Patent
Sevinc et al.

(10) Patent No.: US 10,708,229 B2
(45) Date of Patent: Jul. 7, 2020

(54) PACKET INDUCED REVALIDATION OF CONNECTION TRACKER

(71) Applicant: Nicira, Inc., Palo Alto, CA (US)

(72) Inventors: Soner Sevinc, San Francisco, CA (US); Yang Song, San Jose, CA (US); Jonathan Stringer, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 220 days.

(21) Appl. No.: 15/814,272

(22) Filed: Nov. 15, 2017

(65) Prior Publication Data

US 2019/0149518 A1 May 16, 2019

(51) Int. Cl.
*H04L 29/06* (2006.01)

(52) U.S. Cl.
CPC ...... *H04L 63/0263* (2013.01); *H04L 63/0254* (2013.01); *H04L 63/0236* (2013.01); *H04L 63/20* (2013.01)

(58) Field of Classification Search
CPC ............. H04L 63/0263; H04L 63/0254; H04L 63/0236; H04L 63/20
USPC ............................................................ 726/4
See application file for complete search history.

(56) References Cited

U.S. PATENT DOCUMENTS

| | | | |
|---|---|---|---|
| 8,488,577 B1 * | 7/2013 | MacPherson | H04L 45/308 370/338 |
| 8,874,789 B1 * | 10/2014 | Zhu | H04L 45/00 709/238 |
| 9,203,748 B2 * | 12/2015 | Jiang | H04L 45/64 |
| 10,375,155 B1 | 8/2019 | Cai et al. | |
| 2005/0089327 A1 | 4/2005 | Ovadia et al. | |
| 2005/0114648 A1 | 5/2005 | Akundi et al. | |
| 2006/0195896 A1 | 8/2006 | Fulp et al. | |
| 2008/0095153 A1 | 4/2008 | Fukunaga et al. | |
| 2009/0249472 A1 * | 10/2009 | Litvin | H04L 63/0263 726/14 |
| 2009/0271586 A1 * | 10/2009 | Shaath | G06F 12/1466 711/163 |
| 2012/0213074 A1 * | 8/2012 | Goldfarb | H04L 43/026 370/235 |
| 2014/0003422 A1 * | 1/2014 | Mogul | H04L 41/069 370/389 |
| 2014/0096183 A1 | 4/2014 | Jain et al. | |

(Continued)

*Primary Examiner* — Saleh Najjar
*Assistant Examiner* — Peiliang Pan
(74) *Attorney, Agent, or Firm* — Adeli LLP

(57) ABSTRACT

A method of revalidating a connection tracking table of a flow-based managed forwarding element (MFE) that stores a set of firewall rules associated with each of a set of network connections and a connection table that stores a firewall rule identification and a set of state values associated with each of said network connections. The method receives a change in one or more firewall rules stored at the MFE. The method receives a packet that requires stateful firewall rule check on a particular connection after the change in the firewall rules. When the rule identification retrieved from the connection table is not the same as the new firewall rule associated with the particular connection, the method updates the firewall rule identification and the set of state values associated the particular connection using the new firewall rule identification associated with the particular connection.

20 Claims, 12 Drawing Sheets

(56) References Cited

U.S. PATENT DOCUMENTS

| | | | |
|---|---|---|---|
| 2014/0321459 A1* | 10/2014 | Kumar | H04L 47/2425 |
| | | | 370/360 |
| 2015/0016279 A1 | 1/2015 | Zhang et al. | |
| 2015/0078384 A1 | 3/2015 | Jackson et al. | |
| 2015/0103679 A1 | 4/2015 | Tessmer et al. | |
| 2015/0124608 A1 | 5/2015 | Agarwal et al. | |
| 2015/0237013 A1 | 8/2015 | Bansal et al. | |
| 2015/0295831 A1 | 10/2015 | Kumar et al. | |
| 2016/0105333 A1 | 4/2016 | Lenglet et al. | |
| 2016/0164826 A1* | 6/2016 | Riedel | H04L 61/1511 |
| | | | 709/223 |
| 2016/0277294 A1* | 9/2016 | Akiyoshi | H04W 40/02 |
| 2016/0373364 A1* | 12/2016 | Yokota | H04L 12/6418 |
| 2017/0019329 A1* | 1/2017 | Kozat | H04L 45/563 |
| 2017/0195255 A1* | 7/2017 | Pham | H04L 49/25 |
| 2017/0273099 A1* | 9/2017 | Zhang | H04W 72/14 |
| 2017/0339110 A1 | 11/2017 | Ni | |
| 2018/0115471 A1 | 4/2018 | Curcio et al. | |
| 2018/0184281 A1 | 6/2018 | Tamagawa et al. | |
| 2018/0227216 A1 | 8/2018 | Hughes | |
| 2019/0089679 A1* | 3/2019 | Kahalon | H04L 63/0254 |
| 2019/0149512 A1 | 5/2019 | Sevinc et al. | |
| 2019/0149516 A1 | 5/2019 | Rajahalme et al. | |

\* cited by examiner

PACKET INDUCED REVALIDATION OF CONNECTION TRACKER

BACKGROUND

A flow-based software switch operates by matching incoming packets with one or more flow entries. Each flow entry includes a set of matching criteria and a set of actions. The matching criteria specify a subset of the packet header values for which it requires a match. When a packet matches the set of matching criteria of a flow entry, the action or actions specified by the corresponding set of actions are performed on the packet.

Flow entries in a flow-based software switch are stateless. The flow entry rules are written over only the stateless fields and metadata of the packet that are being processed. However, to implement a firewall, some firewall rules require knowledge of connection state.

For stateful firewall rules, a record has to be kept of at least the admitted packets in order to correlate the subsequent packets to determine whether the packets belong to a previously established connection. The record can then be used, for example, to admit reply direction packets for the connections where forward direction packets were admitted. A connection tracker keeps track of logical network connections and relates the packets to the established connections.

Firewall rules can change frequently, for example every minute. As firewall rules change, the individual entries in the connection table may need to be updated. For instance, an entry may become invalid since the rule that created the entry no longer exists, or a different rule governs the entry. Since a connection tracker can contain hundreds of thousands of connections, it is a challenge to handle update of these entries.

BRIEF SUMMARY

Some embodiments provide a packet-induced revalidation scheme for revalidating the entries of a connection tracker. These embodiments utilize the original network traffic to detect only rule changes that are relevant and update the connection tracker entries in-band based on the network traffic. The revalidation mechanism updates only the required connection tracker entries, which are the connections that have sent packets since last rules change.

This is in contrast to an offline approach, where for example, a daemon would check rule changes and performs updates on connection tracker entries in an out-of-band manner. The traditional out-of-brand approach leaves inconsistency between firewall rules and connection tracker entries. The packet-induced revalidation provides the advantage of updating the connection tracker entry right after the particular packet matches the new rules. The connection tracker entry is, therefore, immediately updated.

Some embodiments utilize different actions such as "resubmit with original packet" action and "conntrack commit (forced/unforced)" to update the connection tracker entries. The packet-induced revalidation works by using the original packet metadata (e.g., a header n-tuple including source IP address, source port address, destination IP address, destination port number, and protocol used) and, in some cases, the current packet metadata in a connection tracker entry to lookup the current firewall rules and update the entry with the new matched rule information.

The updating of a connection tracker entry in some embodiments is not limited to a delete-and-add operation, since sometimes it is desirable to change auxiliary information for a connection (e.g., the rule identification, logging bit, etc.) rather than rewrite of the original connection tracker entry. Some embodiments handle several "transition cases", where there is a need to handle the transitioning of the connection tracker entry from one state to another. There is a different transition case depending on several factors such as the type of the packet seen (data/control, init/response), the previous state of the connection tracker entry (i.e., stateful or stateless), the new matched rule (i.e., stateful or stateless), and the type of stateful rule (i.e., application-level gateway (ALG) or no-ALG).

The packet-induced revalidation in some embodiments is performed by handling these transition cases and by using two open vSwitch (OVS) interfaces "resubmit with original packet" action and "conntrack commit. The "resubmit with original packet" allows using original packet n-tuple stored in the connection tracker entry to match the latest rule set.

The "conntrack commit" allows rewriting/updating connection tracker entry to transition into a new state. There is two commit actions: unforce commit and force commit. The unforce commit does not change the connection tracker entry's n-tuple and, therefore, so the connection tracker entry's direction does not change. The force commit updates the connection tracker entry' n-tuple with the n-tuple of the packet used in the force commit to change the connection tracker entry's direction. Both force and unforce commit actions can change auxiliary information (such as mark, label, etc.) in the connection tracker entry The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a packet-induced revalidation scheme for revalidating the entries of a connection tracker. These embodiments utilize the original network traffic to detect the rule changes that are relevant and update the connection tracker entries in-band based on the network traffic. The packet-induced revalidation works in conjunction with the OVS architecture that implement megaflows. The OVS architecture uses a slow-path userspace daemon and a fast-path kernel module. The forwarding decisions and network protocol processing are handled in the userspace. The kernel module includes a cache that stores flows received from the user space. When a packet's flow matches a cached entry, the kernel module performs the associated cached action on the packet.

The OVS implements megaflows by including wildcard fields that wildcard the fields that do not affect packet forwarding in order to allow more flows to use the cached entries of the fast-path kernel module. The megaflows cache the userspace flows and as long as there is no rule change, no packets other than the initial packets of a flow are processed in the slow-path userpace. The packet-induced revalidation scheme mechanism of some embodiments updates only the required connection tracker entries, which are the connections that have sent packets since last rules change. This is in contrast to an offline approach, where for example, a daemon would check rule changes and performs updates on connection tracker entries in an out-of-band manner.

I. Connection Revalidation

In some embodiments, the packet processing operations (e.g., classification operations, forwarding actions, etc.) are performed by a managed forwarding element (MFE) that operates as a software forwarding element. OVS is an example of a flow entry-based software forwarding element. In some embodiments, MFEs operate on host machines that host virtual machines or other data compute nodes that serve as the sources and destinations for packets (e.g., in the virtualization software of such a host machine). For example, an MFE might operate on a host machine that hosts virtual machines for several different logical networks, and would implement the several logical networks for each of the virtual machines residing on the host. The MFE in some embodiments is configured and managed by a network controller.

Figure 1:
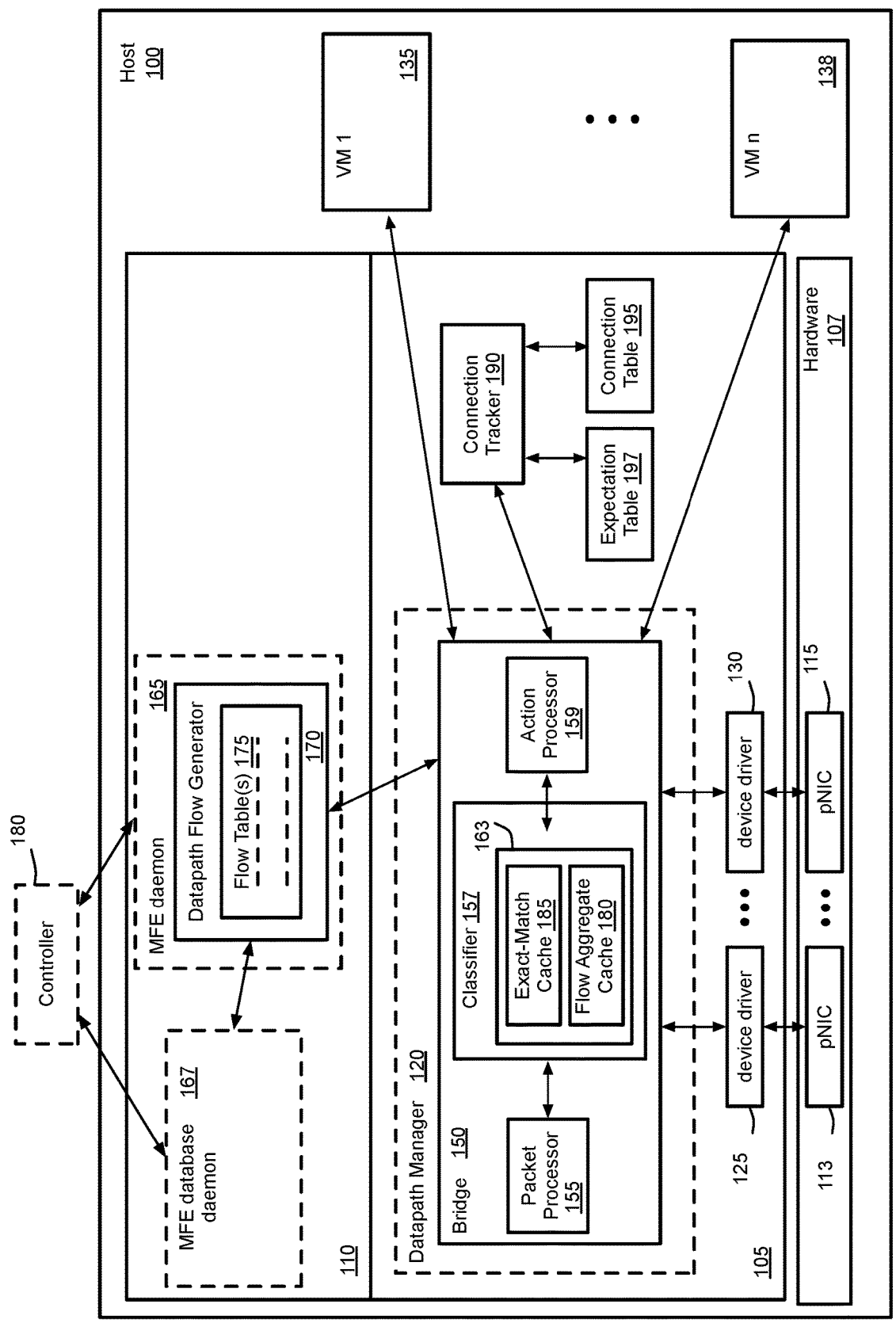
FIG. 1 conceptually illustrates an architectural diagram of a host machine on which a software-implemented MFE and a connection tracker of some embodiments are implemented.

FIG. 1 conceptually illustrates an architectural diagram of a host machine 100 on which a software-implemented MFE and a connection tracker of some embodiments are implemented. In some embodiments, the MFE is implemented in the virtualization software (e.g., in the hypervisor) of the host 100. In this example, the MFE includes several components, including a datapath manager 120, an MFE daemon 165, and MFE database daemon 167. In some embodiments, the datapath manager 120 operates in a kernel 105 of the virtualization software while the MFE daemon 165 and the MFE database daemon 167 both operate in the user space 110 of the virtualization software.

As shown in FIG. 1, the host 100 includes hardware 107 (although the figure shows a software architecture diagram, the hardware 107 is displayed in order to represent the physical network interface cards (pNICs) 113 and 115 of the host machine), virtualization software kernel 105, virtualization software user space 110, and several virtual machines (VMs) 135-138. A VM is a software implementation of a machine such as a computer.

The MFE is a first-hop forwarding element for the VMs 135-138. The hardware 107 may include typical computer hardware (e.g., processing units), volatile memory (e.g., RAM), nonvolatile memory (e.g., hard disk, optical disks, solid-state memory, etc.), network adapters, etc. As shown, the hardware 107 also includes pNICs 113 and 115 for connecting a computing device to a network.

The virtualization software is a software abstraction layer that operates on top of the hardware 107 and below any operating system in some embodiments. In some embodiments, the kernel 105 performs virtualization functionalities (e.g., to virtualize the hardware 107 for several virtual machines operating on the host machine). The kernel 105 handles various management tasks, such as memory management, processor scheduling, or any other operations for controlling the execution of the VMs 135-138 operating on the host machine.

As illustrated in FIG. 1, the kernel 105 includes the datapath manager 120 and a connection tracker 190. The connection tracker has a connection table 190 and an expectation table 195, which are described below. The datapath manager processes and forwards network data (e.g., packets) between VMs running on the host 100 and network hosts external to the host (e.g., network data received through the pNICs 113 and 115). In some embodiments, the VMs 135-138 running on the host 100 couple to the datapath manager through a bridge 150.

In some embodiments, the bridge 150 manages a set of rules (e.g., flow entries) that specify operations for processing and forwarding packets. The bridge 150 communicates with the MFE daemon 165 in order to process and forward packets that the bridge 150 receives. In the example of FIG. 1, bridge 150 includes a packet processor 155, a classifier 157, and an action processor 159. The packet processor 155 receives a packet and parses the packet to strip header values. The packet processor 155 performs a number of different operations. For instance, in some embodiments, the packet processor 155 is a network stack that is associated with various network layers to differently process different types of data that it receives. Irrespective of all the different operations that it can perform, the packet processor 155 passes the header values to the classifier 157. In some embodiments, the packet processor stores these header values in one or more registers that are stored for a packet. In some embodiments, the packet processor 155 defines an object (e.g., a data structure) for the packet that includes the registers. The packet object is then used to represent the packet in the MFE.

The classifier 157 accesses one or more datapath caches 163 (also referred to as a flow cache) to find matching flow entries for different packets. For instance, in some embodiments, the classifier includes a flow aggregate cache 180 that contains flow entries, each of which is matched by packets falling into a particular traffic aggregate class. That is, each of the flow entries in the aggregate cache specifies a subset of the packet header values for which it requires a match, with the other packet header fields being wildcarded (i.e., a packet can match the flow entry while having any values for the wildcarded fields). In some embodiments, each of the flow entries in the datapath cache 163 specifies an action for the action processor 159 to perform on packets that match the flow entries. These datapath cache flow entries are installed by the classifier 157, in some embodiments, based on processing of a packet through the set of flow tables 175 by the MFE daemon 165.

The classifier 157 also, or alternatively, includes an exact-match cache 185 in some embodiments. The exact-match cache of some embodiments includes entries that are matched by packets belonging to specific data flows (using, e.g., a flow key of packet headers extracted from the packet that uniquely identifies a connection). In some embodiments, an exact-match cache entry includes the match conditions (e.g., the flow key) and either an action or a reference to one of the flow entries in the traffic aggregate cache. As such, multiple different exact-match entries might refer to the same cached flow entry (e.g., for similar data flows for the packets of which the forwarding element will perform the same action).

When the classifier 157 receives the header values for a packet, it first performs a check with the exact-match cache to determine whether the packet belongs to a data flow that already has an entry in the cache. If a match is found in the exact-match cache, the classifier sends the packet to the action processor 159 with the action specified by the matched entry. When the packet does not belong to a data flow for which the exact-match cache already stores an entry, the classifier 157 performs a lookup on the aggregate flow cache to find a matching flow entry. When a matching flow entry is found in the aggregate flow cache, the classifier stores a new exact-match cache entry, which can be used for subsequent packets that belong to the same data flow.

In certain cases, no matching flow entries can be found in the datapath cache (e.g., for the first packet of a data flow that does not share enough characteristics with other data flows). In these cases, the MFE shifts control of the packet processing to the MFE Daemon 165 for a full set of packet processing operations (i.e., executing of numerous lookup stages over the flow tables 175, possibly including conjunctive match lookups). After completing the processing for a packet, the classifier 157 sends the packet to the action processor 159. The action processor 159 performs the set of actions specified for the packet.

The MFE daemon 165 of some embodiments includes a datapath flow generator 170. The datapath flow generator 170 is a component of the MFE that makes forwarding and other packet processing decisions. For any packet that is not matched in the datapath cache 163 (e.g., because the packet is the first in a new transport-layer connection), the datapath flow generator 170 performs the one or more flow table lookups required to process the packet, and then generates new flow entries to install in the cache 163. In some embodiments, the datapath flow generator includes or works in conjunction with a separate classifier (not shown) in order to find one or more matching flow entries in the flow tables 175. Unlike the classifier 157, the MFE daemon 165 may perform one or more resubmits (i.e., be resubmitted back to the classifier with packet data modified based on actions performed by previous matched flow entries).

Flow entries of the MFE in some embodiments are stateless. The flow entry rules are written over only the stateless fields and metadata of the packet that are being processed. However, to implement a firewall, some firewall rules require knowledge of connection state. For instance, a firewall rule may require packets received from outside the host of the MFE on a new connection to be dropped while packets received from outside the host of the MFE on established connections to be allowed.

When a firewall rule requires the packet connection status, the matching criteria in the flow entry that defines the firewall rule refer to the packet connection status. As a result, the datapath manager 120 sends the incoming packets to the connection tracker 190 when packet matches a flow entry that specifies an action that requires accessing the connection tracker.

A. Connection Table Entries

Figure 2:
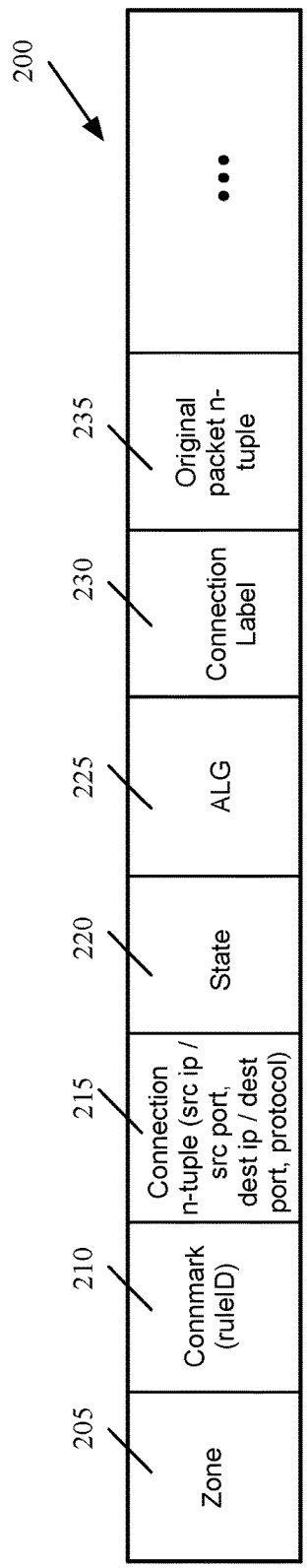
FIG. 2 illustrates an example of a connection entry in a connection table in some embodiments.

FIG. 2 illustrates an example of a connection entry in a connection table in some embodiments. As shown, the connection entry 200 includes fields for zone 205, rule identification 210 referred to as connection mark (connmark), the connection n-tuple (e.g., a 5-tuple including source IP address, source port address, destination IP address, destination port number, and protocol used) 215, state 220, application-level gateway (ALG) 225, connection label (connlabel) 230, and original packet n-tuple.

The zone 205 is an identifier that is associated with a network device such as a Virtual Interface (VIF) that is sending and receiving the packets. A VIF is an abstraction of a network interface that allows the applications to access the interface independent of the physical interface involved. Each stateful entry in the connection table 200 represents a connection that can be used to match packets in the initiation and response directions.

The corresponding matching rule identification (ruleID) is stored in connmark field 210. The connection 5-tuple 215 represents the connection initiator. The term initiator is a distributed firewall (DFW) concept, which refers to the sender of the packet that first matched a rule and created the connection table entry. The connection initiator is not the actual initiator in the IP layer. The state field 220 includes the state of the connection such as un-replied, established, invalid, etc.

The ALG field 225 includes the application-level gateway (also referred to as application-level proxy) information for a connection. The ALG is an application program that acts as a proxy when a connection is established between a client and an application server that is behind a firewall. The ALG appears to the client as an end point server and determines whether to allow or dent traffic to the application server.

The ALG is used to manage ports and firewall permissions for protocols such as file transfer protocol (FTP), session initiation protocol (SIP), etc., that use different flows for signaling and data transfers. In the setup stage, these protocols use signaling flow over a control connection to negotiate the configuration parameters for the establishment of the data flow. The actual packet traffic is then sent over a separate data connection.

The connection label 230 includes additional information for the connection as described below. The connection table entry 200 also includes the n-tuple (e.g., source IP address, source port address, destination IP address, destination port number, and protocol used) 235 for the original packet that caused the connection entry to be generated. The original packet (also referred to as original direction packet or initial packet) is the first packet that establishes a new connection.

Figure 3:
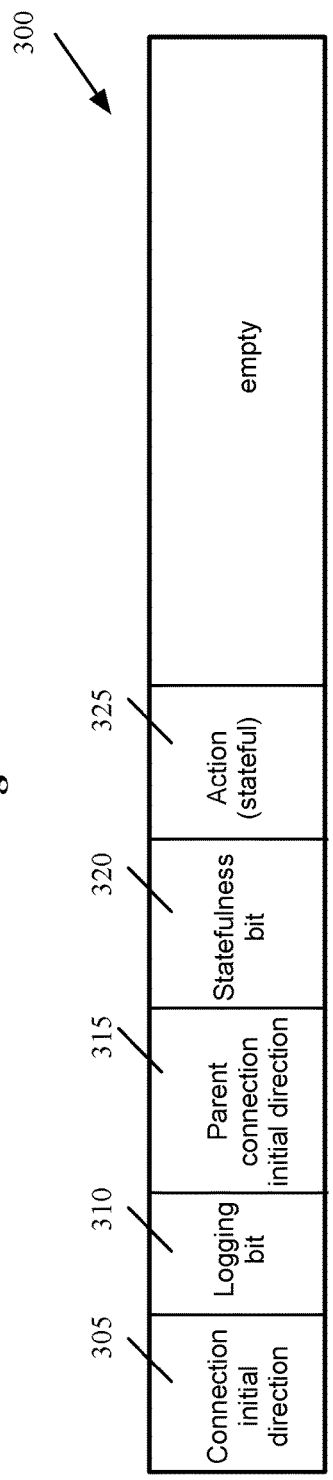
FIG. 3 illustrates an example of a connection tracker connection label field for a stateful connection in some embodiments.

FIG. 3 illustrates an example of a connection label field 300 for a stateful connection in some embodiments. As shown, the connection label field 300 includes a bit 320 that indicates whether the connection is stateful or stateless. For instance, a value of 0 may indicate that the connection is stateless and a value of 1 may indicate the connection is stateful (or vice versa). In the example of FIG. 3, the statefulness field indicates that the connection is stateful.

As shown connection label 300 also includes additional connection information such as the connection's initial direction 305 (e.g., ingress/egress), parent connection initial direction (e.g., ingress/egress) 315, statefulness bit 320, and action 325. For none-ALG rules, there is no difference between the parent connection and connection. There is also no difference between the parent connection and connection the ALG control connections. When the ALG establishes the data connection, the data connection will have its own connection tracker entry. The term parent connection herein refers to the control connection while the term connection refers to the data connection.

The action field 325 specifies the actions such as allow, deny, or reject to perform on packets that match the corresponding connection entry 200. The logging bit 310 specifies whether or not the last packet of a connection and the rule identification 210 that allowed the connection are logged. The last packet of a connection is determined differently for different protocols. For instance, the last packet for a transmission control protocol (TCP) connection is determined when the FIN bit in the packet header to indicate the sender wants to stop its half of the TCP connection. The last packet for a user datagram protocol (UDP) connection is determined by the expiration of a timeout. When the logging bit is set for a connection tracker entry and the traffic is allowed, the first packet and the last packet of the connection are logged. When the logging bit is set for a connection tracker entry and the traffic is rejected or denied, only the first packet of the connection is logged.

Figure 4:
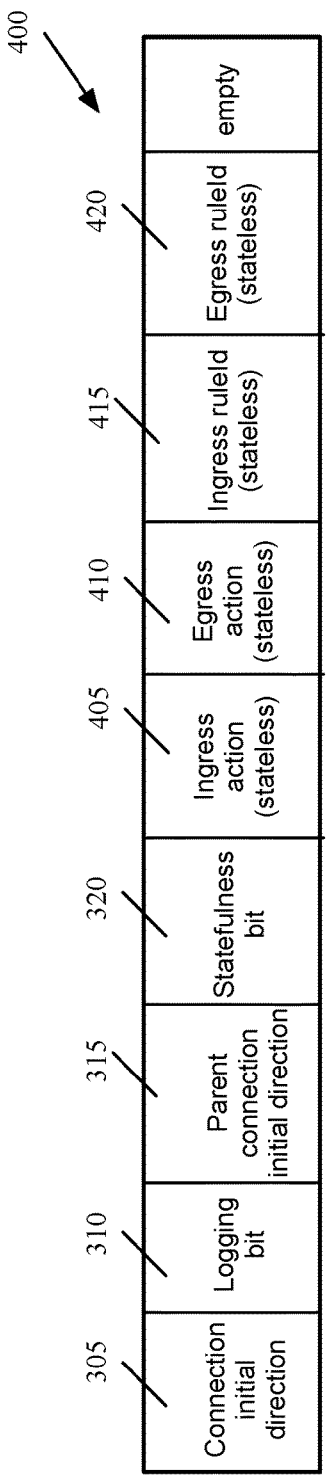
FIG. 4 illustrates an example of a connection tracker connection label field for a stateless connection in some embodiments.

FIG. 4 illustrates an example of a connection label field 400 for a stateless connection in some embodiments. In this example, the statefulness bit 320 indicates that the connection is stateless. With the statefulness bit indicating that the entry is stateless, the entry represents a stateless flow. For a stateless connection, the 5-tuple in 215 in the corresponding connection entry is not a connection initiator but solely the 5-tuple for the particular flow. The connmark 210 field in the corresponding connection entry is also cleared for the stateless connections. As shown, the connection label 400 for a stateless connection entry includes ingress action 405, egress action 410, ingress rule identification 415, and egress rule identification 420.

Some embodiments make a connection table lookup. If there is no match found in the table, the packet is run through the firewall rules to find a matching rule. An entry in the connection table is then created by using that connmark (or rule identification) and ALG parameters. The following sections describe what happens to an existing entry as the firewall rules change and the packets that used to match a rule do not match the same rule any more. The connmark field 210 is used for storing the matching rule ID, for connections that match a stateful rule. For a stateless rule, since there is no connection to track in the DFW, the ingress rule identification 415 and the egress rule identification 420 that the packet n-tuple match are store in the connection label. The mark filed for stateless rule is not used.

A. Connection Behavior

The connection tracker behavior is described in steady state, assuming that firewall rules are currently consistent with the connection table. The consistency of the firewall rules and the connection table entries has to be persevered in the transition cases that are explained below. Before a packet is run through firewall rules, a connection table lookup is performed. The packet is then processed depending on the returned field values. The packets with an n-tuple that match the n-tuple of a table entry are allowed without checking them against the firewall rules. In some embodiments, when the source address, source port, destination address, destination port, and protocol of a packet match the corresponding fields of a table entry, the connection trackers returns a value of "init" to indicate that the packet's header matches the n-tuple of a table entry.

The connection tracker identifies the response packets by returning a connection lookup result such as "resp." The response packets are packets that their (i) destination address and destination port number match the source address and source port number in the table, (ii) source address and source port number match the destination address and destination port number in the table, and (iii) the protocol matches the protocol in the table.

A connection tracker lookup provides information such as the packet direction ("init" or "resp") and statefulness. The current packet's n-tuple is used to match stateless firewall rules. The current packet's n-tuple is also used to match rules for a new connection. The original packet's n-tuple stored in the connection tracker table is used to match firewall rules for stateful connections. Based on the firewall rule that is matched, the connection tracker entry is committed and updated.

The response packets belong to the same connection as a connection that was previously allowed and entered in the connection table. The response packets are, therefore, allowed without having to run them through firewall rules.

The connection tracker also identifies the data packets that are associated with an existing control connection in the connection table. Some protocols such as FTP use separate control and data connections between a pair of communication nodes such as client server pair. For these protocols, the original packet is the packet that establishes the master connection (i.e., the control connection). The corresponding data connection is referred to as the related connection, which may have different source and destination IP addresses and/or different source and destination port numbers.

When a data packet is received for a protocol that uses different control and data connections (as described above by reference to ALG), the data packet's n-tuple is used for the connection tracker lookup. The lookup creates a connection tracker entry for the data connection and fills the entry's "original" field (e.g., field 235 in FIG. 2) with the control packet's n-tuple. The connection tracker lookup returns a state of "related" for the data connection. The "original" n-tuple (i.e., the control connection's n-tuple) stored in connection tracker table is used to match the firewall rule and update the data packet's connection tracker with commit action. As a result, as long as the control packet still matches the ALG rule, the data packet is also allowed. However, if the original n-tuple no longer matches the ALG rule, the current data packet's n-tuple is used to match the rule. As a result, the verdict for the data connection will not depend on the corresponding control packet.

The last packet of a connection is logged if the "logging bit" 310 in FIGS. 3 and 4 is set in the matching entry. The rule identification (i.e., the connmark 210) that allowed the connection is also committed to the connection tracker table. The connection tracker handles the logging out-of-band.

B. Packet Induced Revalidation

When the firewall rules change, some of the fields of a connection table entry may have to change. For instance, a simple example is when a stateful rule is replaced by another stateful rule that matches the packet. In such a case, the connmark is updated in order for the packets to be logged with correct rule identification. Although packet induced revalidation is described by reference to several examples related to the changes in firewall rules, it should be understood that the invention is also applicable to revalidating other rules. For instance, packet induced revalidation is also applicable to network extensibility (NetX) rules including network layer 7 (L7) firewall rules (e.g., hypertext transfer protocol (HTTP), intrusion detection system (IDS), intrusion prevention systems (IPS), file, malware detection), etc. NetX provides a set of application programming interfaces (APIs) that are used in for deploying third-party networking and security services in a datacenter.

Figure 5:
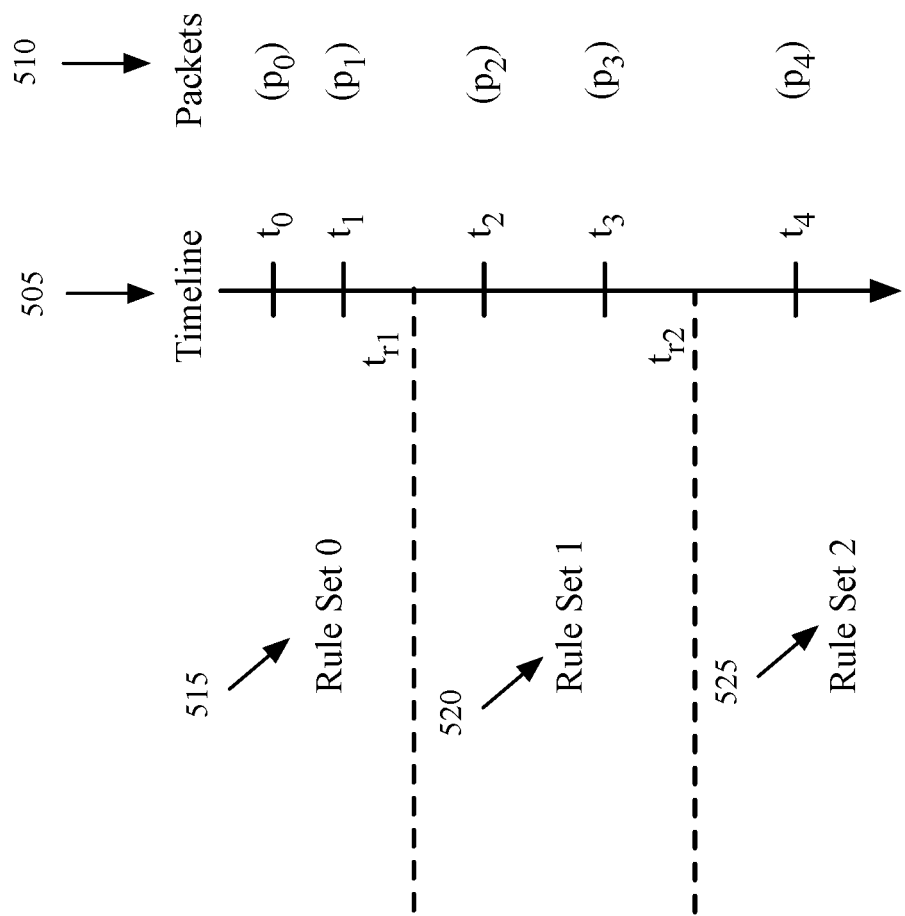
FIG. 5 illustrates an example timeline where rules are changed at times trj and packets arrive at times tj independent of each other.

FIG. 5 illustrates an example timeline where rules are changed at times trj and packets arrive at times tj independent of each other. The figure shows a timeline 505 and a series of packets, pj that belong to the same connection. For instance, the packets p0-p4 arrive at times t0-t4, respectively and are either in the forward direction or the reverse direction ("init" or "resp" directions) of the packet that caused the connection to be created.

The first packet of the connection, p0, arrives at time t0 and creates an entry in the connection table (i.e., packet p0 is the original (or initial) packet of the connection). As shown, at the time of the arrival of packet p0, the rule set 0 115 is in effect. The rule set is, e.g., used to check the firewall rules against the packet processed by the MFE.

At times tri (shown by the dashed lines) the rules change. For instance, rule set 0 515 is replaced by rule set 1 520 at time tr1 and rule set 1 520 is replaced by rule set 2 125 at time tr2. Therefore, although some packets such as p0 and p1 that arrived prior to the rule change can rely on the connection table state, the packets such as p2 and p3 that arrive after rule set change can no longer rely on the connection table state. As a result, the connection table state has to be revalidated in order to apply rule set 1 to packet t2 that arrive after rule change.

One option would be to revalidate all connection tracker entries at each trj (where a change in the rule set occurs). But this option is inefficient because there can be tens of thousands of entries in the connection table. The forwarding element may never receive packets that belong to some connections between trj and tr(i+1) where the next rule set change occurs. Therefore revalidating these connections in advance would amount to extraneous work. Moreover, this revalidation would require an out of band (or offline) sweeper, which is not trivial to implement in a fail safe way.

Accordingly, some embodiments perform connection revalidation per-packet, at every tj. As described above, megaflow cache in the kernel module of an OVS switch does not change as long as there are no firewall rule changes. As a result, revalidating packets such as p1 and p3 introduce little performance impact as these packers are processed by the kernel module in the fast-path. The MFE caches the action for the same packet header values during processing of p0 and p2, respectively. As an example, the MFE caches the header fields of packet p2 after p2 is validated against the firewall rules. The revalidation of connection entry for a subsequent packet (such as p3) on the same connection is quickly performed by using the cached values.

Figure 6:
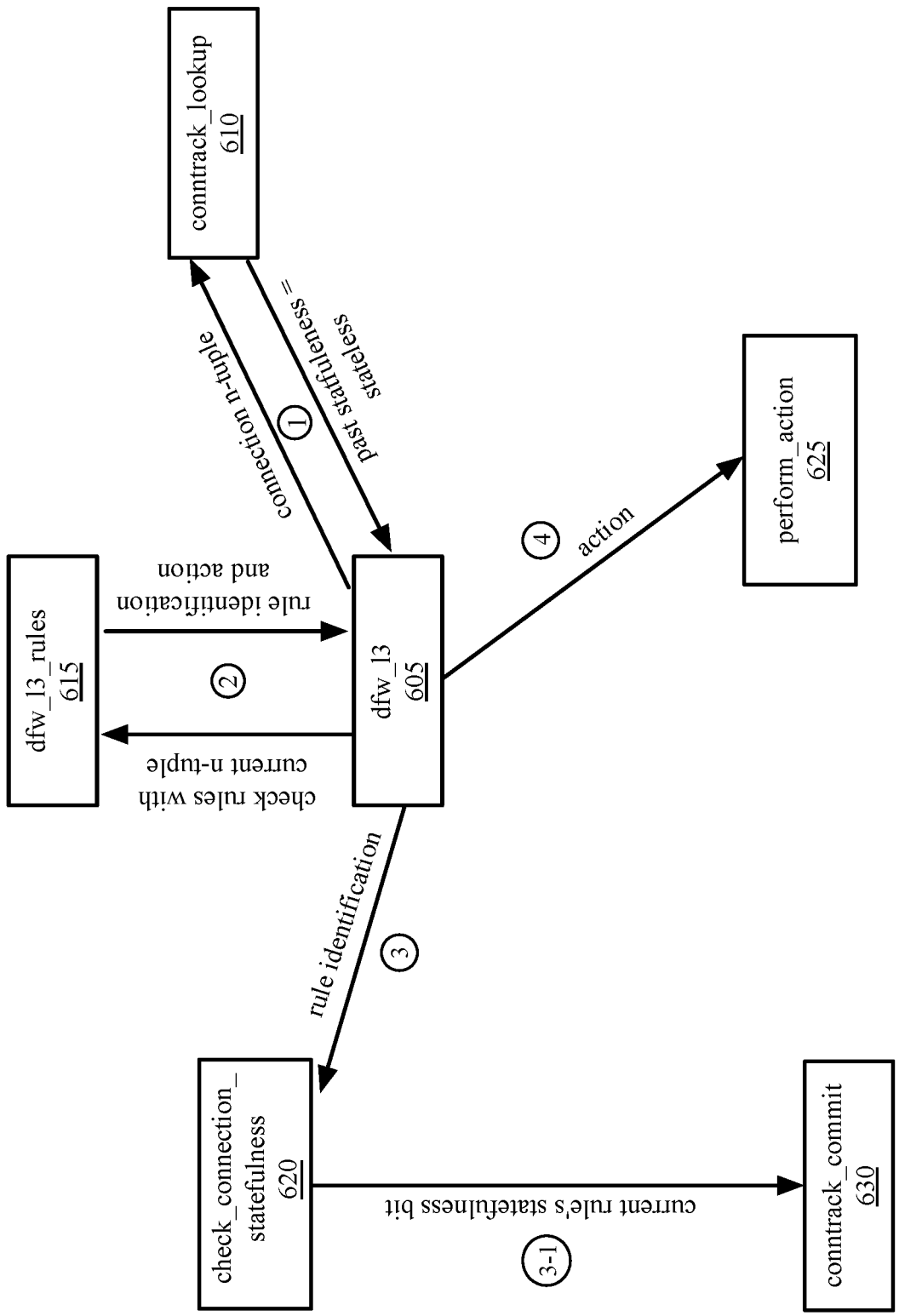
FIG. 6 conceptually illustrates different steps taken for packet-induced revalidation of the connection table state in a "stateless past" scenario in some embodiments.

FIG. 6 conceptually illustrates different steps taken for packet-induced revalidation of the connection table state in a "stateless past" scenario in some embodiments. The figure shows several software modules of an MFE that are activated when packets (such as packets p2 and p4 in FIG. 5) are received after a change in the firewall rule set. The steps are shown in circled alphanumerical labels.

The dfw_l3 module 605 is activated when an action in the MFE match-action pipeline requires checking layer 3 (L3) distributed firewall rules. Distributed firewalls provide the ability to specify firewall rules for enforcement at different enforcement points within a network. The dfw_l3 module in some embodiments is activated after layer 2 (L2) firewall rules are checked. As shown, the dfw_l3 module 605 activates the conntrack_lookup module 610, the dfw_l3 rules module 615, the check_connection_statefulness module 620, and the perform_action module 625. After completion, each one of these modules returns the control back the dfw_l3 module 605.

In step 1, the connection's n-tuple (e.g., the source and destination addresses, the source and destination port numbers, and the protocol used) is checked against the entries in the connection table (e.g., by comparing the connection n-tuple specified in a firewall rule with the connection initiator n-tuple 215 in connection table shown in FIG. 2). As shown, in step 1, dfw_l3 module 605 activates the conntrack_lookup module 610 and provides the n-tuple of a connection.

The conntrack_lookup module 610 finds a connection entry with a connection initiator n-tuple 215 (shown in FIG. 2) that matches the current packet's n-tuple. The conntrack_lookup module then returns with an indication as whether or not the connection is used to match a stateful rule or a stateless rule. In this example, the conntrack_lookup module 610 indicates that the connection is used to match a stateless rule. For instance, the statefulness field 320 in the connection label 400 shown in FIG. 4 has a value that indicates that the connection is used to match a stateless rule.

In step 2, the dfw_l3 module 605 activates the dfw_l3 rules module 620 to provide the firewall rule identification and actions for the current packet's source and destination addresses. In step 3, the dfw_l3 module 605 activates the check_connection_statefulness module 620 to check the statefulness bit for the rule that the packet is currently matching (i.e., for the rule identification returned in step 2).

In step 3-1, the check_connection_statefulness module 620 activates the conntrack_commit module 1130. If the connection is stateless, there is a stateless to stateless transition. The check_connection_statefulness module 620 activates the conntrack_commit module 630 to only change the connection label (230 in FIG. 2) by an unforce commit.

If connection is stateful, there is a stateless to stateful transition. The check_connection_statefulness module 620 activates the conntrack_commit module 630 to update the n-tuple 210 in FIG. 2, the connmark 210, and the connection label 230 by using the force commit. In step 4, the dfw_l3 module 605 activates perform_action module 625 to perform the actions returned in step 2 for the current packet (e.g., to accept, reject, or drop the packet).

Figure 7:
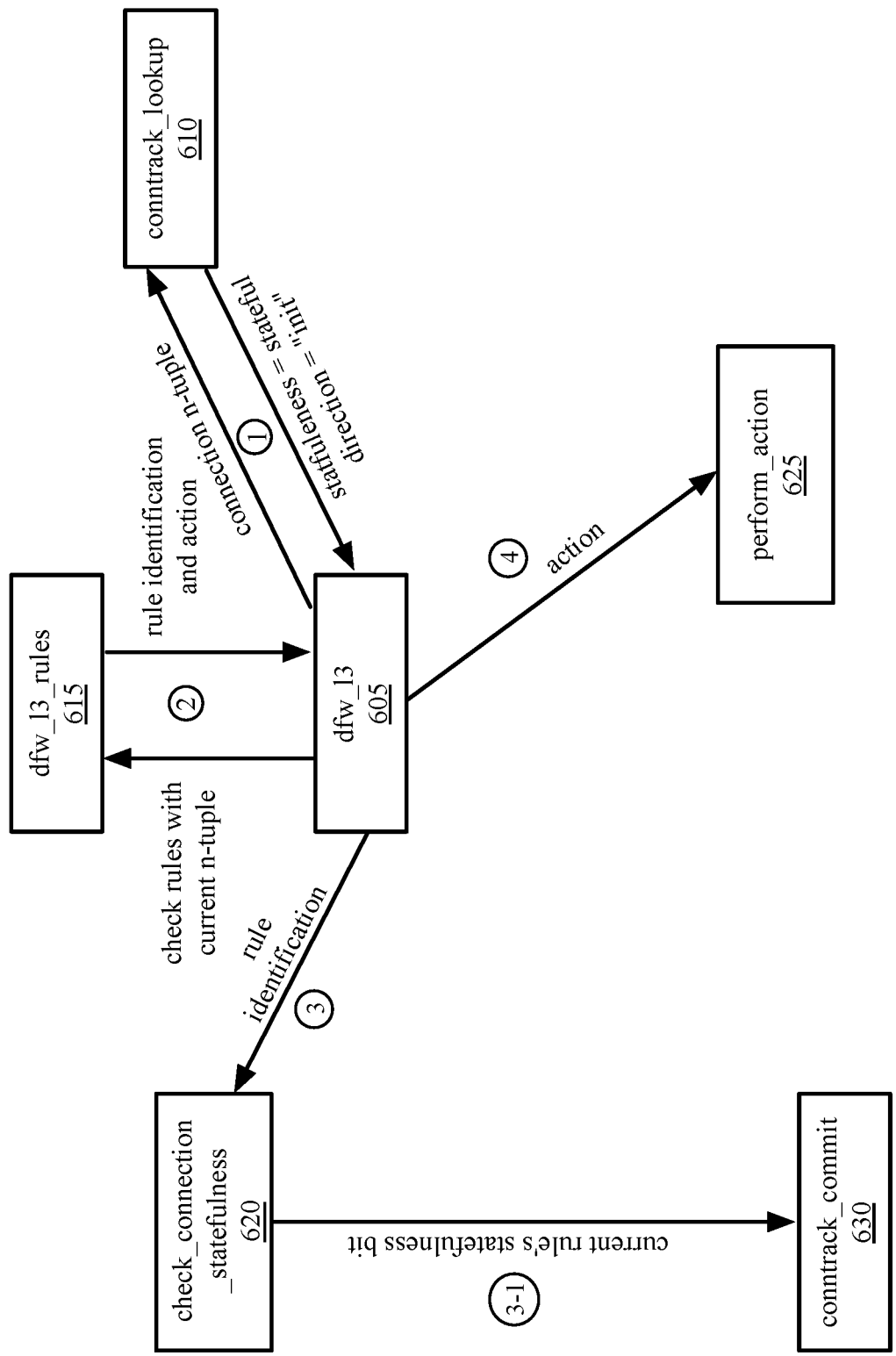
FIG. 7 conceptually illustrates different steps taken for packet-induced revalidation of the connection table state in a "stateful past" scenario when the packet direction is in the same direction as the original direction packet in some embodiments.

FIG. 7 conceptually illustrates different steps taken for packet-induced revalidation of the connection table state in a "stateful past" scenario when the packet direction is in the same direction as the original packet that created the connection in some embodiments. The figure shows the same software modules as in FIG. 6, which are activated when packets (such as packets p2 and p4 in FIG. 5) are received after a firewall rule set change.

The dfw_l3 module 605 is activated when an action in the MFE match-action pipeline requires checking L3 DFW rules. In step 1, the dfw_l3 module 605 activates the conntrack_lookup module 610 and provides the n-tuple of the connection.

The conntrack_lookup module 610 finds a connection entry with a connection initiator n-tuple 215 (shown in FIG. 2) that matches the current packet's n-tuple. In this example, the conntrack lookup module 610 indicates that the connection is stateful. For instance, the statefulness field 320 in the connection label 400 shown in FIG. 3 has a value that indicates that the connection is used to match a stateful rule. The conntrack lookup module 610 also indicates that the packet is in the "init" (or initiation) direction, i.e., the same direction as the first packet that created the connection table entry.

In step 2, the dfw_l3 module 605 activates the dfw_l3 rules module 620 to provide the firewall rule identification and actions for the current packet's source and destination addresses, which are also the connection's initiation direction. In step 3, the dfw_l3 module 605 activates the check_connection_statefulness module 620 to check the statefulness bit for the rule that the packet is currently matching (i.e., for the rule identification returned in step 2).

In step 3-1, the check_connection_statefulness module 620 activates the conntrack_commit module 1130. If the connection is stateless, there is a stateful to stateless transition. The check_connection_statefulness module 620 activates the conntrack_commit module 630 to only change the connection label (230 in FIG. 2) by an unforce commit.

If connection is stateful, there is a stateful to stateful transition (maybe a different rule but the packet's n-tuple is not changing). There is, therefore, no need to change the packet's n-tuple in the connection tracker entry. The check_connection_statefulness module 620 activates the conntrack_commit module 630 to update the connmark 210 and the connection label 230 (shown in FIG. 2) by using the unforce commit. It should be understood that a force commit also performs the same result, as the connection n-tuple is not changing. In step 4, the dfw_l3 module 605 activates perform_action module 625 to perform the actions returned in step 2 for the current packet (e.g., to accept, reject, or drop the packet).

Figure 8:
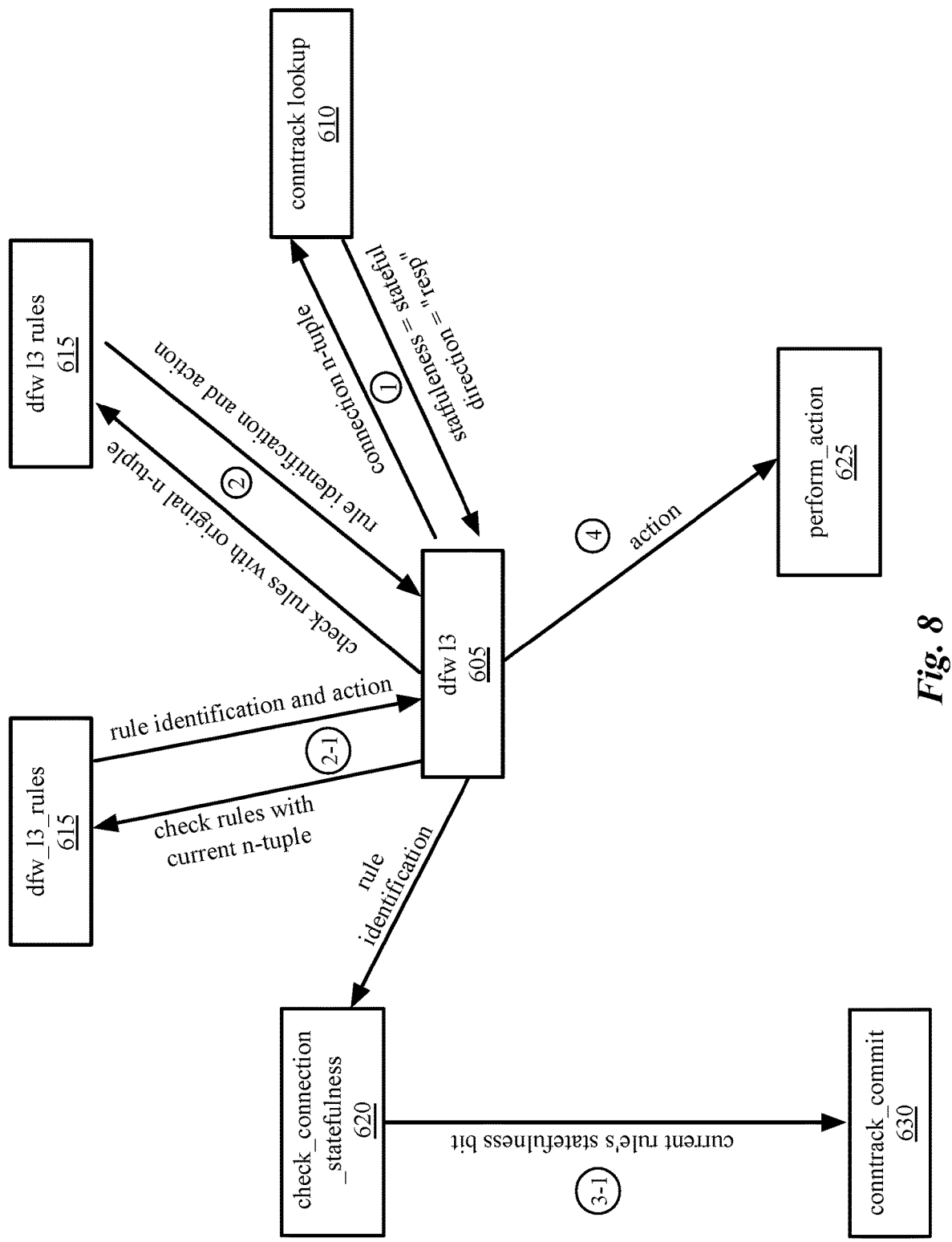
FIG. 8 conceptually illustrates different steps taken for packet-induced revalidation of the connection table state in a "stateful past" scenario when the packet direction is in the opposite direction as the original direction packet in some embodiments.

FIG. 8 conceptually illustrates different steps taken for packet-induced revalidation of the connection table state in a "stateful past" scenario when the packet direction is in the opposite direction as the original direction packet in some embodiments. The figure shows the same software modules as in FIGS. 6-7, which are activated when packets (such as packets p2 and p4 in FIG. 5) are received after a firewall rule set change.

As shown, in step 1, dfw_l3 module 605 activates the conntrack_lookup module 610 and provides the n-tuple of a connection. The conntrack_lookup module 610 finds a connection entry with a connection initiator n-tuple 215 (shown in FIG. 2) that matches the current packet's n-tuple. In this example, the conntrack_lookup module 610 indicates that the connection is stateful. For instance, the statefulness field 320 in the connection label 300 shown in FIG. 3 has a value that indicates that the connection is stateful. The conntrack_lookup module 610 also indicates that the packet is in the "resp" direction, i.e., the opposite direction of the first packet that created the connection tracker entry.

In step 2, the dfw_l3 module 605 activates the dfw_l3 rules module 620 to check the firewall rules with the "original" n-tuple (235 in FIG. 2). In step 3, the dfw_l3 module 605 activates the check_connection_statefulness module 620 to check the statefulness bit for the rule that the packet is currently matching (i.e., for the rule identification returned in step 2). Depending on whether or not the rule is stateful, two scenarios are performed.

In the first scenario, the rule is stateless. In this scenario, the original n-tuple no longer matches the original direction stateful rule. As shown, in this scenario, dfw_l3_rules is activated again (in step 2-1) by using the current packet's n-tuple to match the rule again (this is the reverse direction compared to the connection's initiation direction) and provide the rule's identification. The dfw_l3 module 605 activates the check_connection_statefulness module 620 again to check the statefulness of the rule. If the rule is stateful, conntrack_commit module 630 is activated to use a force commit to change the n-tuple direction, connmark, and connection label. If the connection still matches a stateless rule, then there is a stateful to stateless transition. The conntrack_commit module 630 is activated to use an unforce commit to just update the connection label.

In the second scenario, the rule is stateful. In this scenario, the original n-tuple still matches the original direction stateful rule (although maybe a different rule, but have same 5-tuple). This scenario is the same as "stateful past", "init" direction stateful to stateful transition mentioned above by reference to FIG. 7. In the second scenario, there is a stateful to stateful transition. The conntrack_commit module 630 is activated to use an unforce commit to just update the connection label. Finally, in step 4 in either scenario, the dfw_l3 module 605 activates perform_action module 625 to perform the actions returned in step 2 for the current packet (e.g., to accept, reject, or drop the packet).

C. Transition Cases

Different rule update cases and how the connection table is revalidated by packet-induced revalidation can be seen as a unique points in a multi-dimensional space, where the dimensions are rules or packet related alternatives. These dimensions are described in this section followed by the specific transition cases. The dimensions to consider include rule set change direction, previous state of the connection table entry, state of the new matched rule, revalidator packet direction, type of the stateful rule, and rule action.

Rule changes in the response direction do not lead to rule revalidation. For the response direction, the "original" packet stored in connection tracker is used for rule matching. If rule change happens in the response direction, the rule change will not change the connection. As an example, assume a TCP connection was initiated in the ingress direction. Then, a "DENY ALL" rule in added to the egress direction. This rule is not going to be hit by any packets of this connection. All packets of a connection are always allowed, as long as the stateful rule that created the connection is still valid (i.e., the first packet that created this connection is still able to hit this rule or a similar stateful rule).

The rule set change direction, is therefore, only in the "init" direction. The pervious state of the connection table entry is stored in the statefulness field 320 of the connection label as shown in FIGS. 3 and 4, which indicate whether a rule is stateful (as shown in FIG. 3) or stateless (as shown in FIG. 4).

The state of the new matched rule may be either stateful or stateless. A rule may, therefore, be replaced either by a "stateful" rule, or a "stateless" rule. A rule may be replaced due to either a new rule being added as a higher priority rule, or the previous rule is deleted and a lower priority new rule is revealed (i.e., the previously lower priority rule becomes the highest priority rule). No matter what causes the replacement of a rule, the effects on the revalidation and the determination of the new statefulness are the same.

The revalidator packet, i.e., the first packet after the rule set change (e.g. packets p2 or p4 in FIG. 5) can be an "init" direction packet (i.e., a packet that is in the same direction as the initial packet that created the connection), or a "response" direction packet (i.e., a packet in the opposite direction of the initial packet). Similarly, if the packet is a data connection packet that is related to a control connection, the packet can be in the same direction as the original control packet ("data-init" direction) or in the response direction ("data-response" direction).

The stateful rules may or may not relate to ALG. The stateful type, therefore, includes non-ALG stateful cases referred to herein as "stateful" cases, and ALG related cases referred herein as ALG-stateful (or "ALG" for brevity) cases. The rule actions include accept, deny, or reject that are applicable to both stateful and stateless cases. The deny action just drops the packet while the reject action drops the packet and sends an Internet control message protocol (ICMP) error message (e.g. destination unreachable).

The non-ALG transition cases include stateless to stateless, stateless to stateful, stateful to stateless, stateful to stateful, and stateful to reverse stateful. The ALG transition cases include stateful to ALG, ALG to ALG, ALG to stateful, stateless to ALG/ALG to stateless, and stateful to reverse ALG/ALG to reverse stateful/ALG to reverse ALG.

Figure 9:
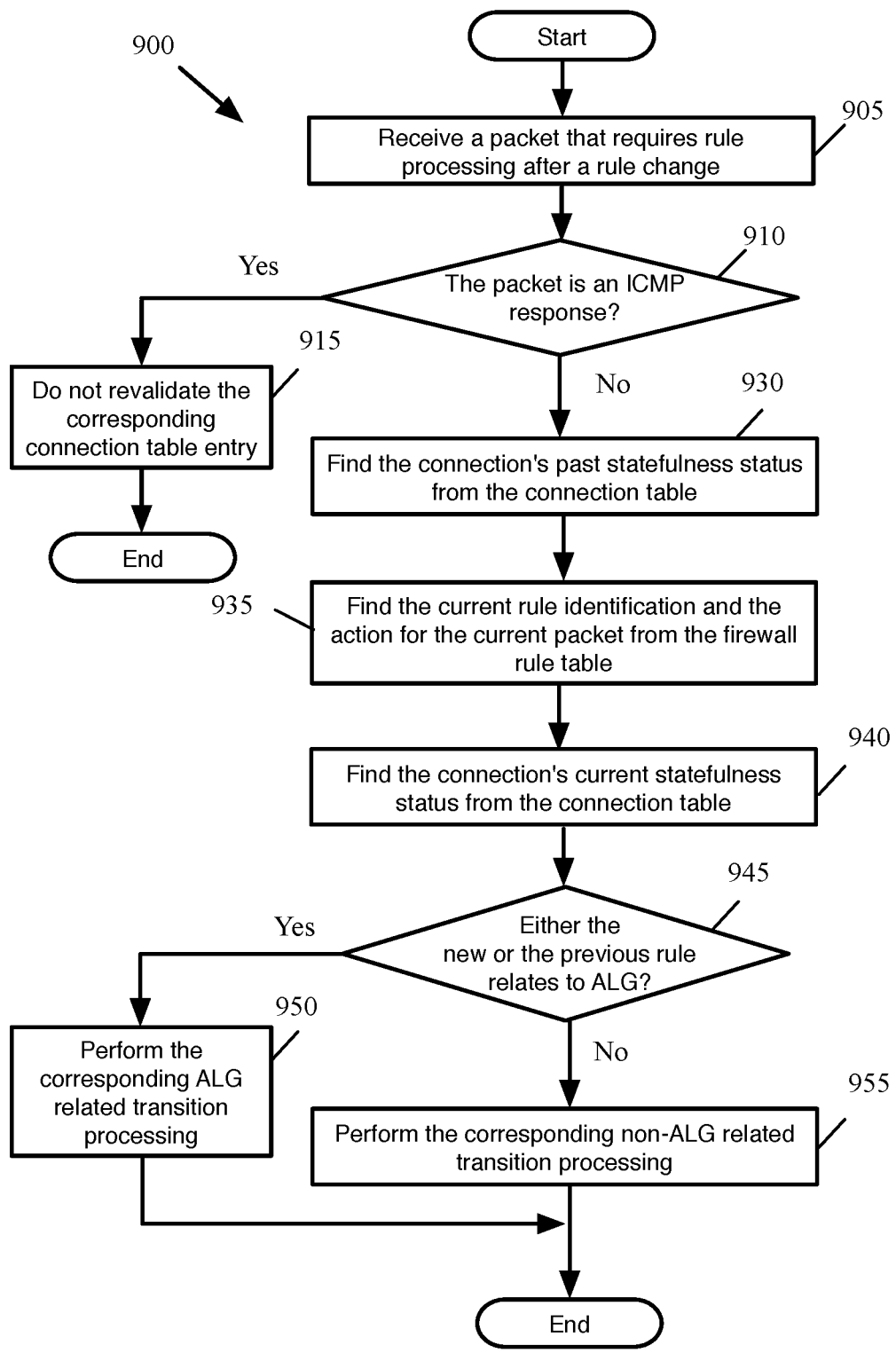
FIG. 9 conceptually illustrates a process for handling transitions in some embodiments.

FIG. 9 conceptually illustrates a process 900 for handling transitions in some embodiments. The process in some embodiments is performed by the datapath manager 120 or the MFE daemon 165 shown in FIG. 1. As shown, the process receives (at 905) a packet that requires rule processing after a rule change. The process then determines (at 910) whether the packet is an ICMP response. If not, the process proceeds to 930, which is described below.

Otherwise the process does not revalidate the corresponding connection table entry. The process then ends. An ICMP packet is used to send error messages by network devices. For instance, an ICMP packet may be used to indicate that a destination is unreachable or a requested service is not available.

When the packet is not an ICMP response packet, the process finds (at 930) the connection's past statefulness status. For instance, the process finds the connection's past statefulness status as described above by reference to step 1 in FIGS. 6-8. The process then finds (at 935) the current rule identification and the action for the packet. For instance, the process finds the current rule identification for the packet as described above by reference to step 2 in FIGS. 6-8.

The process then determines (at 940) the connection's current statefulness status. For instance, the process finds the connection's current statefulness status as described above by reference to step 3 in FIGS. 6-8. The process then determines (at 945) whether the new rule or the previous rule relate to ALG. If yes, the process performs (at 950) the corresponding ALG related transition processing. Further details of the ALG related transition processing are described below by reference to FIGS. 11A-11B. The process then proceeds to 955, which is described below.

When neither the new rule nor the previous rule relate to ALG, the process performs (at 955) the corresponding non-ALG related transition processing. Further details of the non-ALG related transition processing are described below by reference to FIGS. 10A-10B. The process then ends.

Figure 10A:
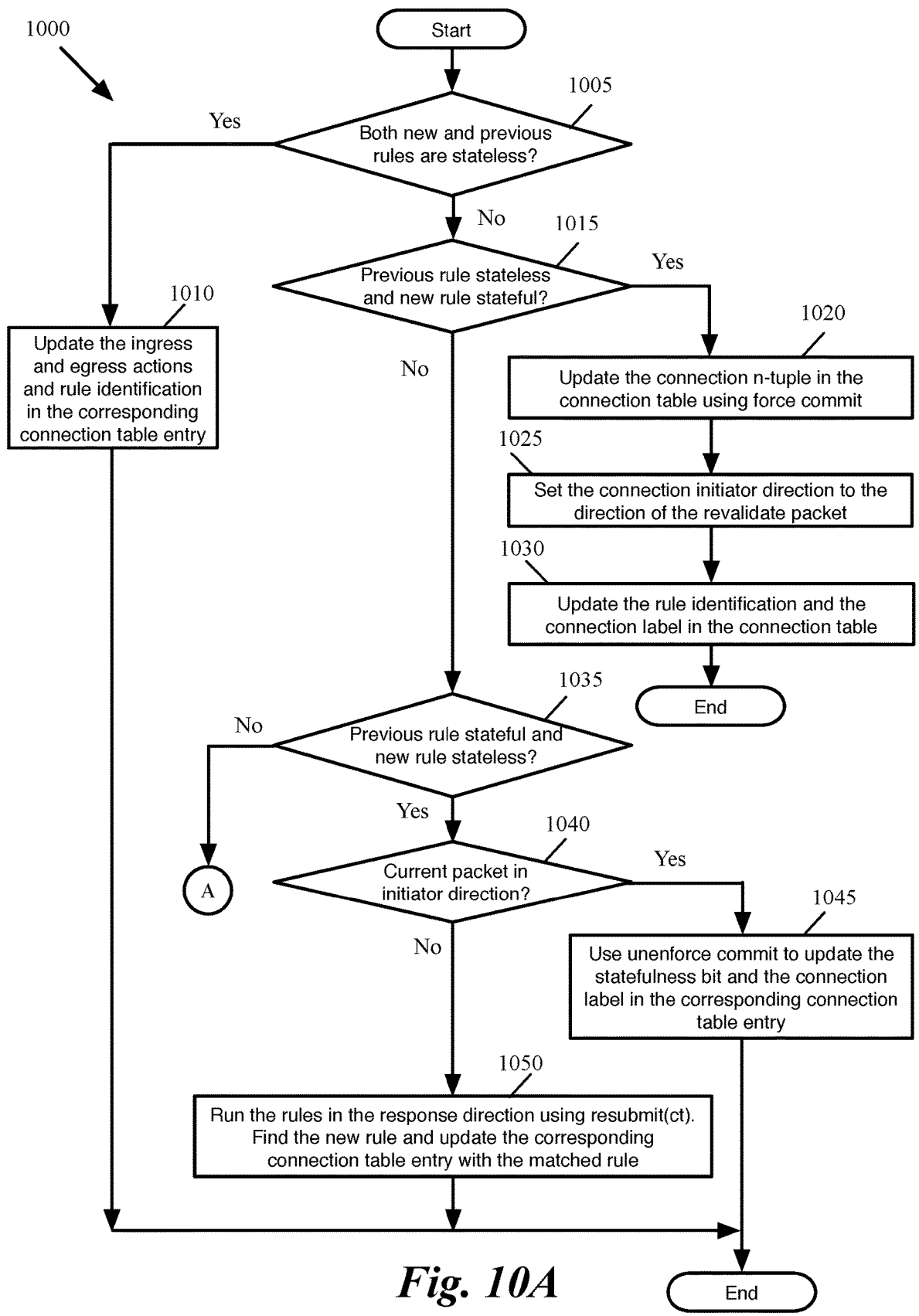
FIGS. 10A-10B conceptually illustrate a process for performing non-ALG related processing in some embodiments.
Figure 10B:
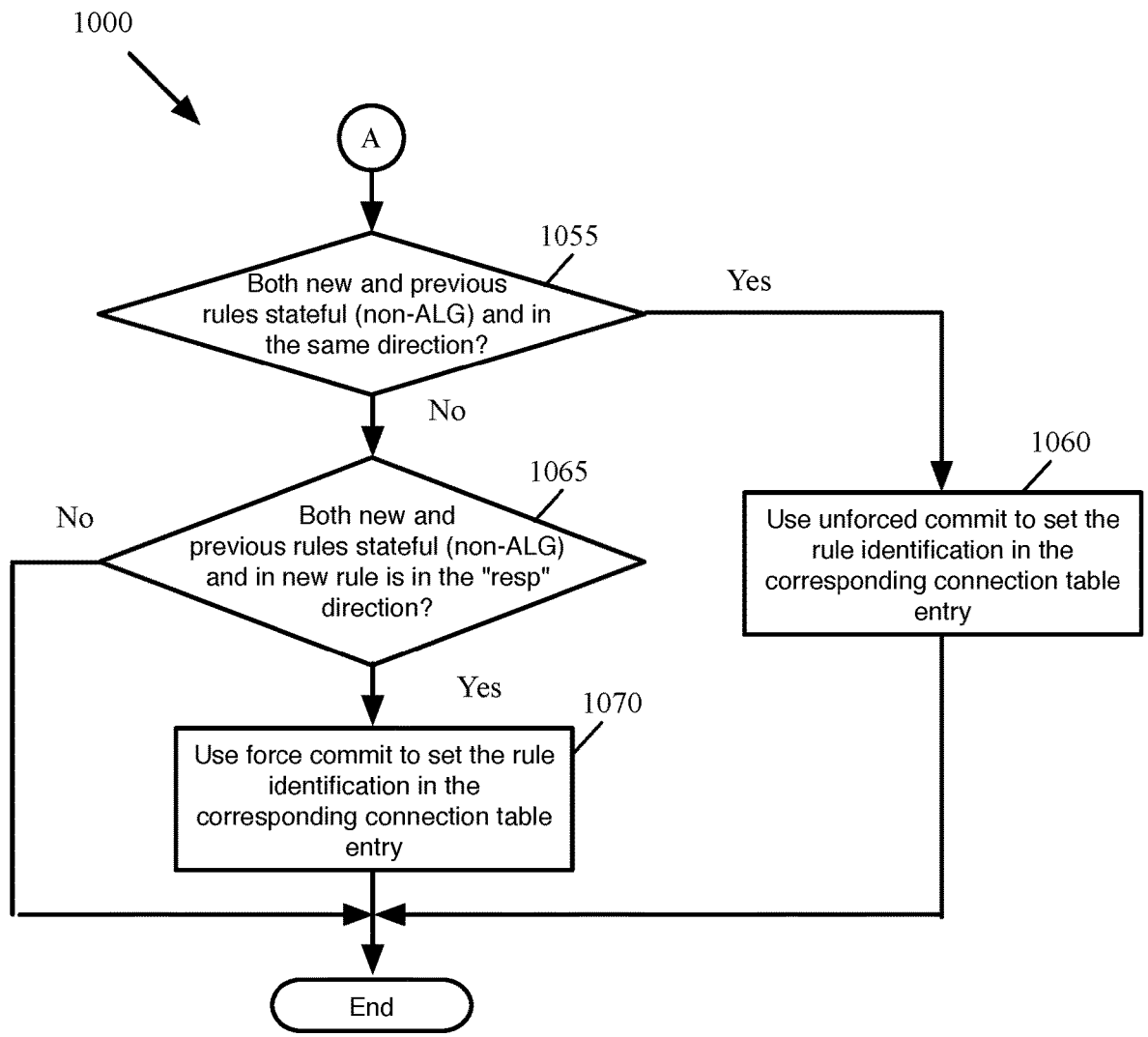

FIGS. 10A-10B conceptually illustrate a process 1000 for performing non-ALG related rule transition processing in some embodiments. The process provides further details of operation 955 in FIG. 9. As shown, the process determines (at 1005) whether both the new and the previous rules are stateless rules. If not, the process proceeds to 1015, which is described below.

Otherwise, the process updates (at 1010) the ingress and egress actions and the rule identification in the corresponding connection table entry. The process then ends. The stateless to stateless transition occurs when a connection that was used to match the stateless rule had a statefulness bit 320 (shown in FIG. 4) and yet matches a stateless rule again after the rule transition. For stateless to stateless transition, there is no need to update the 5-tuple in the connection table. In addition, the statefulness bit in the connection label field would stay the same. A stateless entry represents a "flow" instead of a "connection" so there is no initiator packet and the rule is always matched by using the current packet's 5-tuple. As a result, only the ingress and egress actions and the ingress and egress rule identifications in the connection label (items 405-420 in FIG. 4) need to be updated.

The process determines (at 1015) whether the previous rule is stateless and the new rule is stateful. If not, the process proceeds to 1035, which is described below. Otherwise, the process updates (at 1020) the connection n-tuple in the connection table by using a force commit. The process then sets (at 1025) the connection initiator direction in the connection table to the direction of the revalidation packet (i.e., the current packet). The process then updates (at 1030) the rule identification and the connection label in the connection table. The process then ends. The stateless to stateful transition occurs when a connection matched match a stateless rule (i.e., a rule with statefulness bit set to stateless) but starts matching a stateful rule after the rule transition. For this type of transition, the connection n-tuple has to be updated to the new state by using force commit with current packet's n-tuple. Because, when a packet matches a stateful rule, the distributed firewall has to start keeping track of the corresponding connection. At this point, revalidator packet's 5 tuple is considered "connection initiator" direction. In addition, the rule identification is stored in the connmark filed 170 (shown in FIG. 2) and the connection label field 300 in FIG. 3 is also updated accordingly.

The process determines (at 1035) whether the previous rule is stateful and the new rule is stateless. If not, the process proceeds to 1055, which is described below. Otherwise, the process determines (at 1040) whether the current packet is in "init" direction. If not, the process proceeds to 1050, which is described below. Otherwise, the process uses unforce commit to update the statefulness bit and the connection label in the corresponding connection table entry. The process ends.

When the current packet direction is not "init" direction, the process runs (at 1050) the rules in the response direction by using resubmit (ct). The process also finds the new and update the corresponding connection table entry with the matched rule The stateful to stateless entry occurs when a stateless rule replaces a stateful rule as one of the "stateful past" scenarios described above. The new stateless rule can be hit in either "init" for "resp" direction. When a stateless rule is hit with "init" direction, the connection table entry's statefulness bit is updated and the connection label is updated with unforce commit as described above by reference to FIG. 7. On the other hand, if the first packet (i.e., the revalidator packet) after the rule-update was in "resp" direction, the steps described above by reference to FIG. 8 are performed.

At 1055, the process determines whether both the new and previous rules are stateful (non-ALG) and in the same direction. If not, the process proceeds to 1065, which is described below. Otherwise, the process uses (at 1060) the unforced commit to set the rule identification in the corresponding connection table entry. The process then ends.

The stateful to stateful rule transition occurs when a stateful (non-ALG) rule is replaced by another stateful (non-ALG) rule. The rule identification in connmark 210 in FIG. 2 is initially set during the connection entry creation using commit. To change only the connmark later, the commit is used a second time with the new rule identification (or the new mark). Some embodiments use the commit primitive conntrack_commit(zone=vif_port, mark=reg7, log=rule_log, force=false), which only changes the mark and the label (logging bit for the new rule) without changing the direction, state, ALG, etc. Since the force commit is not used, the direction of the connection does not change. Therefore the same primitive is used to change the mark in both "init" and "resp" directions. The packet is then can be accepted as described above by reference to FIGS. 7 and 8.

At 1065, the process determines whether both the new and previous rules are stateful (non-ALG) and the new rule is in the "resp" direction. If not, the process ends. Otherwise, the process uses (at 1070) the force commit to set the rule identification in the corresponding connection table entry and then ends. This is the case where a stateful rule in response direction takes over the previous stateful rule. This case is similar to the stateless to stateful case with the difference that the distributed firewall has to start keeping track of this connection from the reverse direction. The commit primitive, conntrack_commit (zone=vif_port, mark=reg7, log=rule_log, force=True) changes the direction, as well as connmark and connection label in the connection table.

Figure 11A:
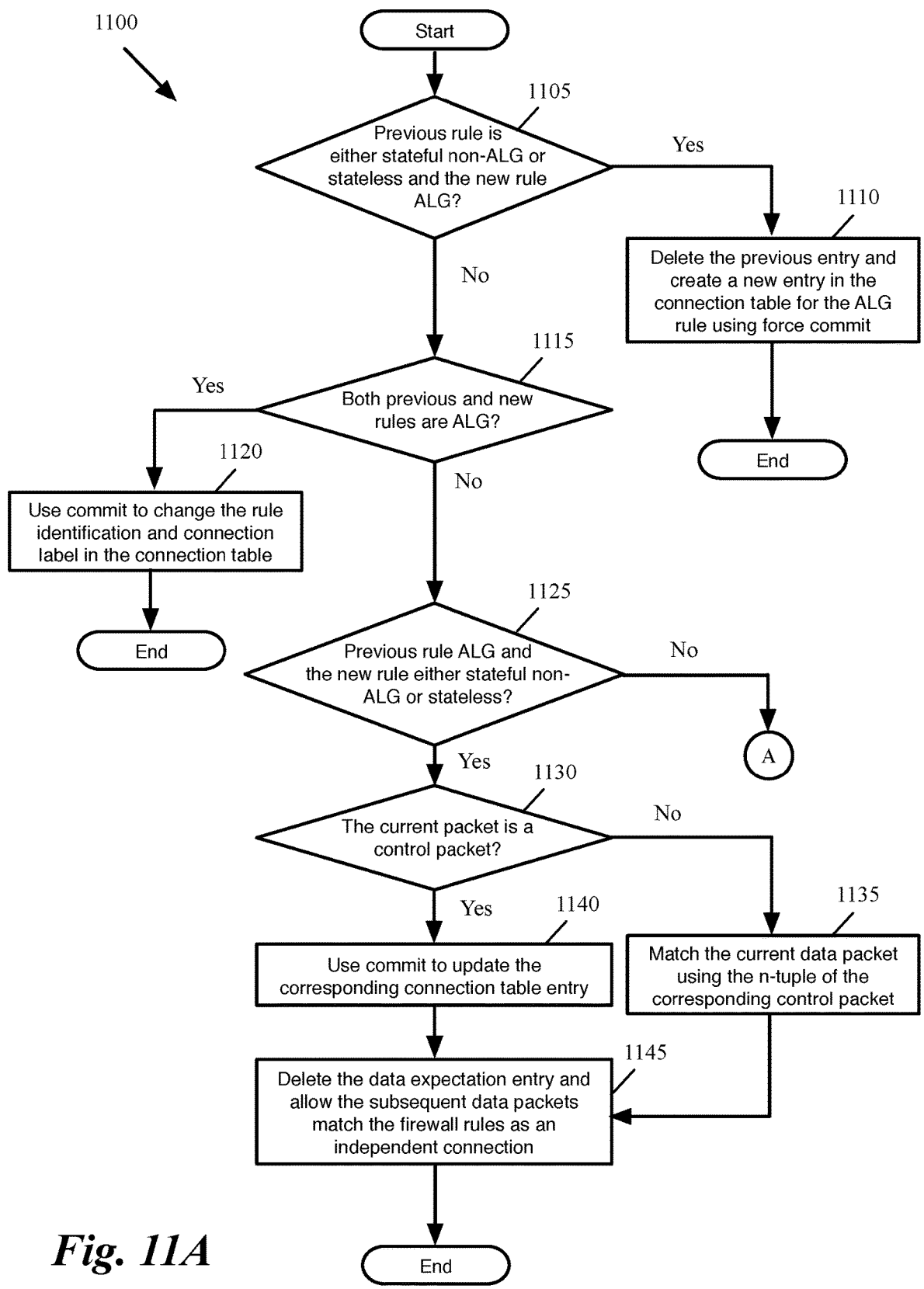
FIGS. 11A-11B conceptually illustrate a process for performing ALG related rule transition processing in some embodiments.
Figure 11B:
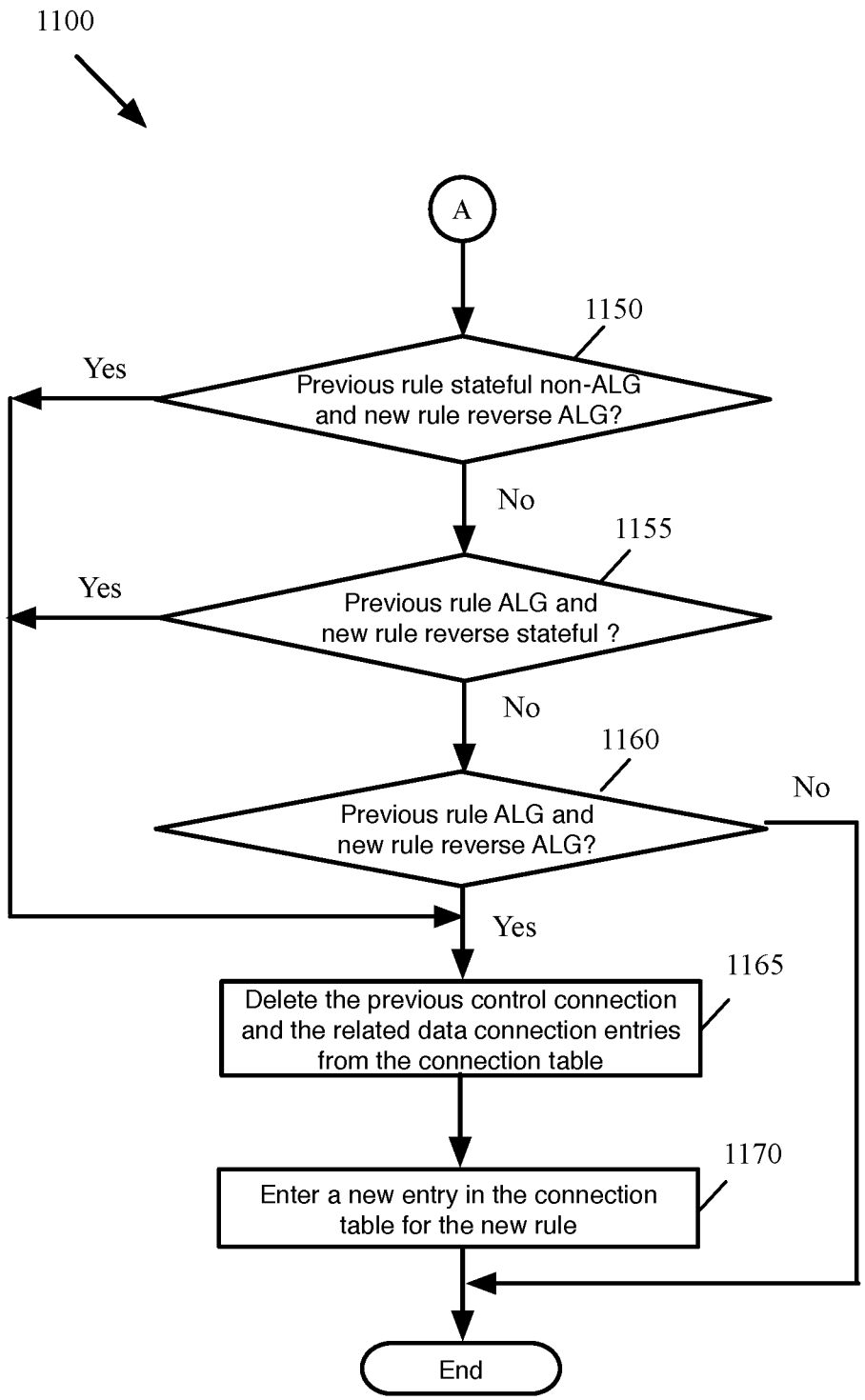

FIGS. 11A-11B conceptually illustrate a process 1100 for performing ALG related rule transition processing in some embodiments. The process provides further details of operation 950 in FIG. 9. As shown, the process determines (at 1105) whether the previous rule is either stateful non-ALG or stateless and the new rule is ALG. If not, the process proceeds to 1115, which is described below.

Otherwise, the process deletes (at 1110) the previous entry and creates a new entry in the connection table for the ALG rule by using force commit primitive. The process then ends. The stateful non-ALG to ALG transition occurs when a stateful non-ALG rule is replaced by an ALG stateful rule (such as FTP).

At 1115, the process determines whether both the previous and the new rules are ALG. If not, the process proceeds to 1125, which is described below. Otherwise, the process uses (at 1120) the commit primitive to change the rule identification and connection label in the connection table. The process then ends. Since an ALG rule should only match a specific protocol (e.g., FTP or trivial FTP (TFTP)), so there is no need to change an existing entry's ALG field. For instance, if an ALG FTP "allow" transits to ALG FTP "deny" for a control packet, the control connection is not able to finish negotiation, even if the data connection expectation exist. The connection is, therefore, blocked. Using the commit primitive to change the connection table entry allows changing the mark and the connection label. If an ALG FTP "allow" transits to ALG FTP "deny" for data packet, the data packet matches the rule using the original n-tuple (i.e., the control packet n-tuple) and is blocked. The mark and connection label of the data connection's connection table entry are also updated by the conntrack_commit.

The process determines (at 1125) whether the previous rule is ALG and the new rule is either stateful non-ALG or stateless. If not, the process proceeds to 1150, which is described below. Otherwise, the process determines (at 1130) whether the current packet is a control packet. If yes, the process uses the commit primitive to update the corresponding connection table entry. The process then proceeds to 1145, which is described below.

Otherwise, the process matches (at 1135) the current data packet by using the n-tuple of the corresponding control packet. The process then deletes (at 1145) the data expectation entry (e.g., in the expectation table 197 in FIG. 1) and allows the subsequent data packets match the firewall rules as an independent connection. The process then ends.

If the transition happens during the control packet, the control connection matches the new stateful rule instead of the ALG rule and the corresponding connection table entry is updated through commit. Assuming the data expectation is deleted, the subsequent data connection matches the firewall rules as an independent connection. If the transition happens during the data packet, the data packet matches the firewall rule by using the original 5-tuple (i.e., the control packet 5-tuple) and finds out that the control packet no longer match ALG rule. After this data packet, the remaining data connection should match the firewall rule as an independent connection.

The process determines (at 1150) whether the previous rule is stateful non-ALG and the new rule is reverse ALG. If yes, the process proceeds to 1165, which is described below. Otherwise, the process determines (at 1155) whether the previous rule is ALG and the new rule is reverse stateful. If yes, the process proceeds to 1165, which is described below. The process determines (at 1160) whether the previous rule is ALG and the new rule is reverse ALG. If not, the process ends.

Otherwise, the process deletes (at 1165) the previous control connection and the related data connection entries from the connection table. For instance, the process uses a connection table "delete" API. The process then enters (at 1170) a new entry in the connection table for the new rule. The process then ends. For these cases the connection table delete API is used to delete the old control and related connections first. A new connection table lookup is then made and the new stateful rule is matched.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
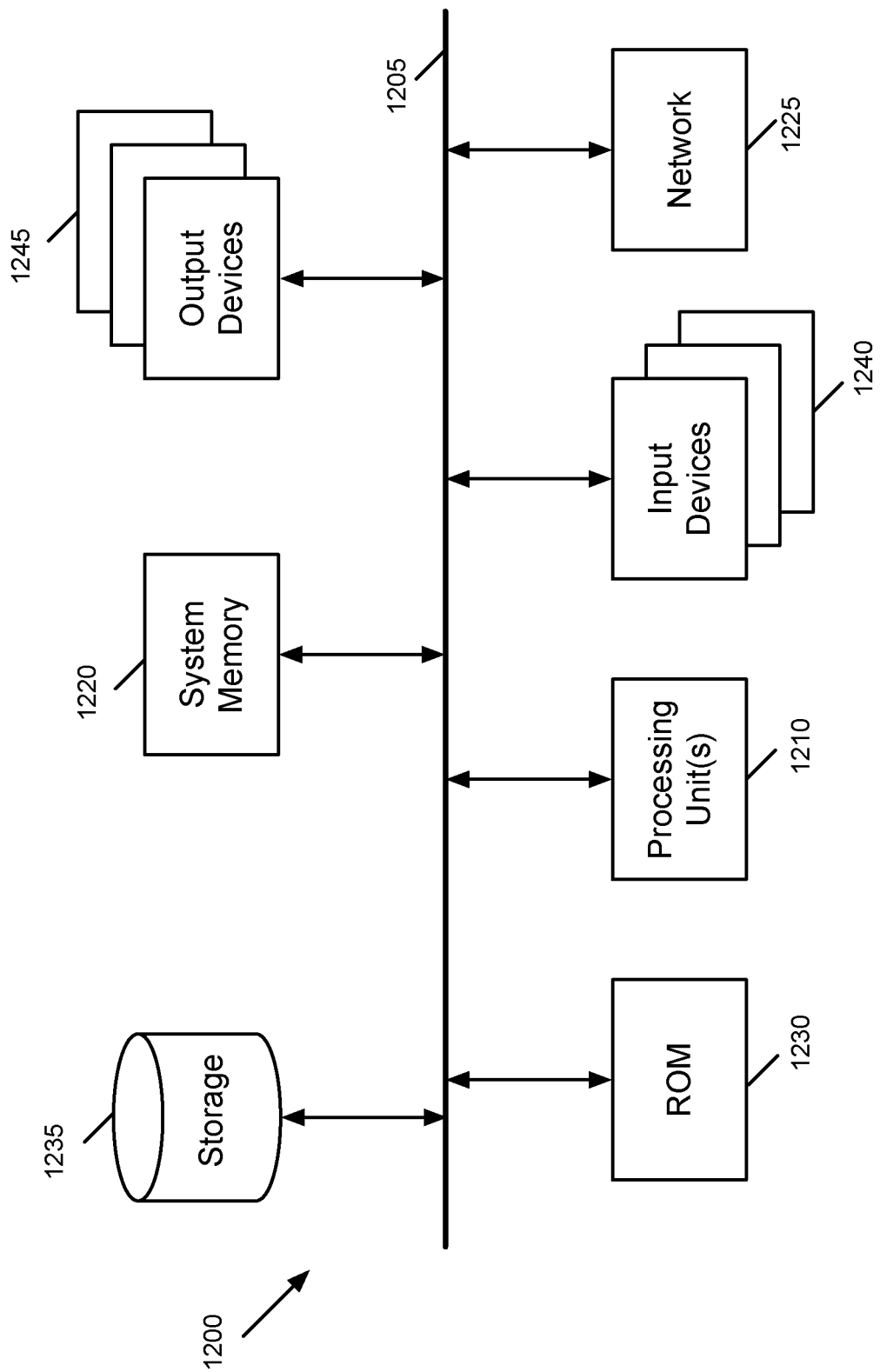
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1220, a read-only memory (ROM) 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1220, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1220 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1220, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 6-11B) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method for using packets to validate entries in a connection tracking table of a firewall engine executing on a host computer, the firewall engine using a firewall rule storage storing a set of firewall rules and using the connection tracking table to track data flows to which the firewall engine has applied firewall rules, the method comprising:
   receiving a packet that is part of a particular flow;
   when the connection tracking table has an entry matching the particular flow:
      retrieving, from the matching entry in the connection tracking table, a set of data stored for an associated flow for which the entry was created in the connection tracking table and for a firewall rule that was previously applied to the flow for which the entry was created;
      identifying a firewall rule in the firewall rule storage that matches the associated flow for which the entry in the connection tracking table was created; and
      when the identified firewall rule comprises an associated set of data that does not match the set of data retrieved from the connection tracking table, updating the connection tracking table based on the identified firewall rule's set of data.

2. The method of claim 1, wherein each entry in the connection tracking table identifies the associated flow for which the entry was created with an n-tuple comprising a source address and a destination address, wherein the set of data stored in each entry in the connection tracking table for the associated flow comprises (i) an n-tuple of a first packet of the associated flow and (ii) a direction of the first packet.

3. The method of claim 2, wherein
   the received packet is in an opposite direction of the first packet of the matching entry's associated flow,
   an entry in the connection tracking table matches the particular flow (i) when the entry stores the n-tuple of the particular data flow or (ii) when the entry stores the n-tuple of a flow related to the particular data flow, and
   identifying the firewall rule comprises using the n-tuple of the first packet of the associated flow to identify the firewall rule in the set of firewall rules.

4. The method of claim 2, wherein each n-tuple further comprises a source port number, a destination port number, and an identification of a protocol used.

5. The method of claim 1, wherein the retrieved set of data stored in the connection table comprises a state value indicating whether the firewall rule that was previously applied to the associated flow is stateful or stateless.

6. The method of claim 5, wherein
   the retrieved set of data indicates that the firewall rule that was previously applied to the associated flow is stateless and the set of data associated with the identified firewall rule indicates that the identified firewall rule is stateful,
   the retrieved set of data comprises an n-tuple of a first packet of the associated flow and a direction of said first packet,
   updating the connection tracking table based on the identified firewall rule's set of data comprises:
      replacing the n-tuple associated with the first packet with an n-tuple of the received packet; and
      replacing the direction of the first packet in the connection tracking table with a direction of the received packet.

7. The method of claim 5, wherein
   the retrieved set of data indicates that the firewall rule that was previously applied to the associated flow is stateless and the set of data associated with the identified firewall rule indicates that the identified firewall rule is stateless,
   the retrieved set of data comprises an n-tuple of a first packet of the associated flow, an ingress direction action, and an egress direction action,
   updating the connection tracking table based on the identified firewall rule's set of data comprises replacing the ingress direction action and the egress direction action with an ingress direction action and an egress direction action associated with the identified firewall rule.

8. The method of claim 5, wherein
   the retrieved set of data indicates that the firewall rule that was previously applied to the associated flow is stateful and the set of data associated with the identified firewall rule indicates that the identified firewall rule is stateless, the retrieved set of data comprises a direction of a first packet of the associated flow, a direction of the packet received as part of the particular flow is the same as the direction of the first packet, updating the connection tracking table based on the identified firewall rule's set of data comprises replacing an indicator in the matching entry that specifies that the firewall rule is stateful with another indicator that specifies that the firewall rule is stateless.

9. The method of claim 5, wherein the retrieved set of data indicates that the firewall rule that was previously applied to the associated flow is stateful and the set of data associated with the identified firewall rule indicates that the identified firewall rule is stateless, the retrieved set of data comprises a direction of a first packet of the associated flow, a direction of the packet received as part of the particular flow is an opposite direction as the direction of the first packet, updating the connection tracking table based on the identified firewall rule's set of data comprises replacing in the matching entry a rule identifier for the firewall rule that was previously applied to the associated flow in the connection table with a rule identifier for the identified firewall rule.

10. The method of claim 1 further comprising receiving a change in the set of firewall rules, wherein receiving the change does not trigger an update of the rule identifiers and the sets of data stored in the connection table.

11. A non-transitory machine readable medium storing a program which when executed by at least one processing unit uses packets to validate entries in a connection tracking table of a firewall engine executing on a host computer, the firewall engine using a firewall rule storage storing a set of firewall rules and using the connection tracking table to track data flows to which the firewall engine has applied firewall rules, the program comprising sets of instructions for:

receiving a packet that is part of a particular flow;

when the connection tracking table has an entry matching the particular flow:

retrieving, from the matching entry in the connection tracking table, a set of data stored for an associated flow for which the entry was created in the connection tracking table and for a firewall rule that was previously applied to the flow for which the entry was created;

identifying a firewall rule in the firewall rule storage that matches the associated flow for which the entry in the connection tracking table was created; and when the identified firewall rule comprises an associated set of data that does not match the set of data retrieved from the connection tracking table, updating the connection tracking table based on the identified firewall rule's set of data.

12. The non-transitory machine readable medium of claim 11, wherein each entry in the connection tracking table identifies the associated flow for which the entry was created with an n-tuple comprising a source address and a destination address, wherein the set of data stored in each entry in the connection tracking table for the associated flow comprises (i) an n-tuple of a first packet of the associated flow and (ii) a direction of the first packet.

13. The non-transitory machine readable medium of claim 12, wherein the received packet is in an opposite direction of the first packet of the matching entry's associated flow:

an entry in the connection tracking table matches the particular flow (i) when the entry stores the n-tuple of the particular data flow or (ii) when the entry stores the n-tuple of a flow related to the particular data flow, and the set of instructions for identifying the firewall rule comprises a set of instructions for using the n-tuple of the first packet of the associated flow to identify the firewall rule in the set of firewall rules.

14. The non-transitory machine readable medium of claim 12, wherein each n-tuple further comprises a source port number, a destination port number, and an identification of a protocol used.

15. The non-transitory machine readable medium of claim 11, wherein the retrieved set of data stored in the connection table comprises a state value indicating whether the firewall rule that was previously applied to the associated flow is stateful or stateless.

16. The non-transitory machine readable medium of claim 15, wherein the retrieved set of data indicates that the firewall rule that was previously applied to the associated flow is stateless and the set of data associated with the identified firewall rule indicates that the identified firewall rule is stateful, the retrieved set of data comprises an n-tuple of a first packet of the associated flow and a direction of said first packet, the set of instructions for updating the connection tracking table based on the identified firewall rule's set of data comprises sets of instructions for:

replacing the n-tuple associated with the first packet with an n-tuple of the received packet; and replacing the direction of the first packet in the connection tracking table with a direction of the received packet.

17. The non-transitory machine readable medium of claim 15, wherein the retrieved set of data indicates that the firewall rule that was previously applied to the associated flow is stateless and the set of data associated with the identified firewall rule indicates that the identified firewall rule is stateless, the retrieved set of data comprises an n-tuple of a first packet of the associated flow, an ingress direction action, and an egress direction action, the set of instructions for updating the connection tracking table based on the identified firewall rule's set of data comprises a set of instructions for replacing the ingress direction action and the egress direction action with an ingress direction action and an egress direction action associated with the identified firewall rule.

18. The non-transitory machine readable medium of claim 15, wherein the retrieved set of data indicates that the firewall rule that was previously applied to the associated flow is stateful and the set of data associated with the identified firewall rule indicates that the identified firewall rule is stateless, the retrieved set of data comprises a direction of a first packet of the associated flow, a direction of the packet received as part of the particular flow is the same as the direction of the first packet, the set of instructions for updating the connection tracking table based on the identified firewall rule's set of data comprises a set of instructions for replacing an indicator in the matching entry that specifies that the firewall rule is stateful with another indicator that specifies that the firewall rule is stateless.

19. The non-transitory machine readable medium of claim 15, wherein the retrieved set of data indicates that the firewall rule that was previously applied to the associated flow is stateful and the set of data associated with the identified firewall rule indicates that the identified firewall rule is stateless, the retrieved set of data comprises a direction of a first packet of the associated flow, a direction of the packet received as part of the particular flow is an opposite direction as the direction of the first packet, the set of instructions for updating the connection tracking table based on the identified firewall rule's set of data comprises a set of instructions for replacing in the matching entry a rule identifier for the firewall rule that was previously applied to the associated flow in the connection table with a rule identifier for the identified firewall rule.

20. The non-transitory machine readable medium of claim 11, further comprising a set of instructions for receiving a change in the set of firewall rules, wherein receiving the change does not trigger an update of the rule identifiers and the sets of data stored in the connection table.

\* \* \* \* \*